Sept. 1, 1936.  I. KITROSER  2,053,196
TELEMETER
Filed Aug. 28, 1935  2 Sheets-Sheet 1
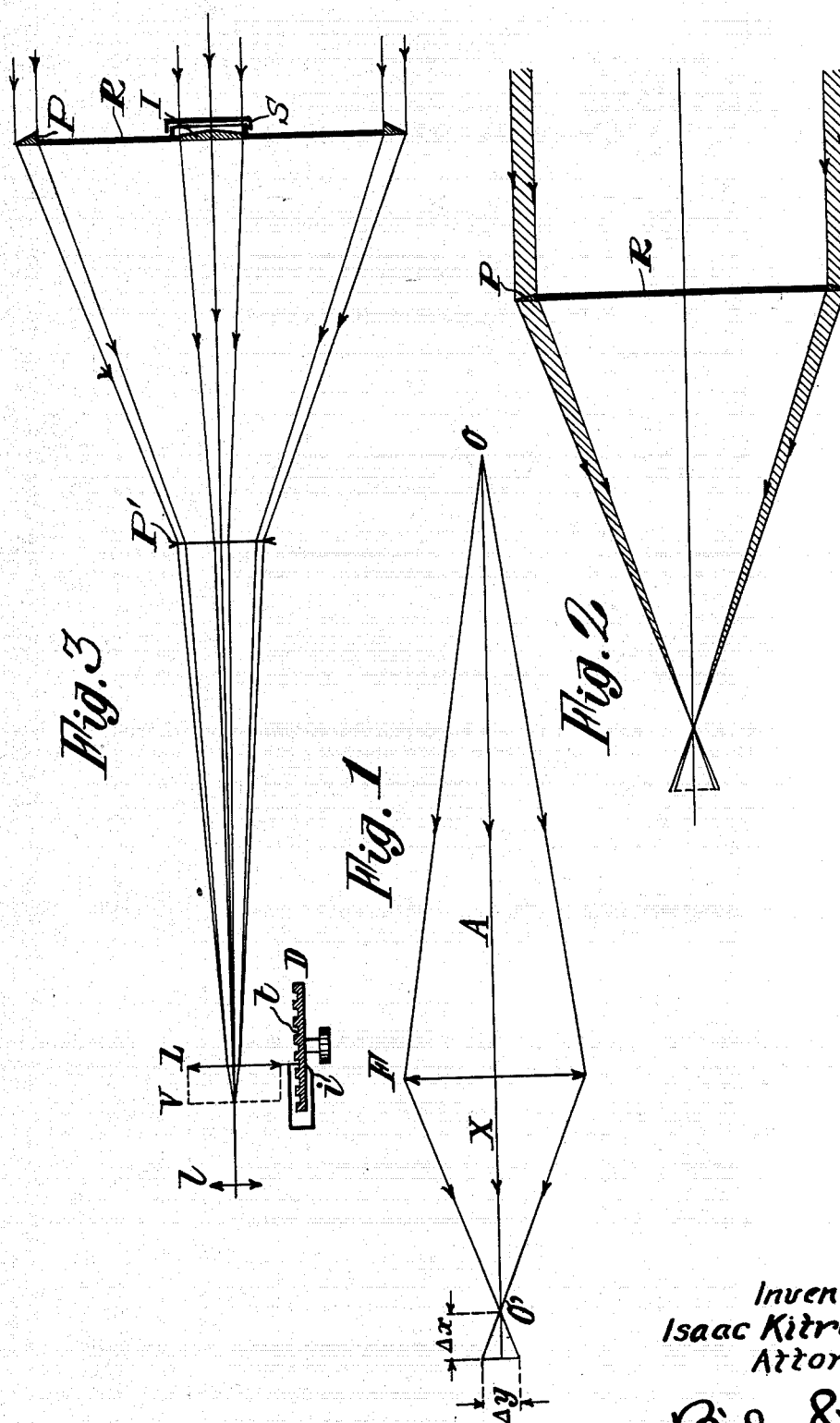
Inventor:
Isaac Kitroser
Attorneys:
Bailey & Pierson Sept. 1, 1936.  I. KITROSER  2,053,196
TELEMETER
Filed Aug. 28, 1935  2 Sheets-Sheet 2

Inventor:
Isaac Kitroser
Attorneys:
Bailey & Carson

Patented Sept. 1, 1936

2,053,196

UNITED STATES PATENT OFFICE 2,053,196

TELEMETER

Isaac Kitroser, Viroflay, France, assignor to Société Bronzavia, Paris, France, a society of France Application August 28, 1935, Serial No. 38,301
In France August 31, 1934

9 Claims. (Cl. 88—2.2)

The present invention relates to telemeters and similar apparatus.

The object of the present invention is to provide an apparatus of this kind which is very easy to manipulate and which can be utilized under any circumstances.

Another object of the invention is to provide an apparatus which can be fitted on a firearm in such manner that it can be used as a kind of sighting apparatus.

The essential feature of the present invention consists in providing an objective of great focal length giving an image of the object the distance of which is to be measured with means for diaphragming the central part of said objective, whereby the position of said image and therefore its distance from said objective can be accurately measured, thus permitting to determine the distance between said object and the objective.

This, and other features of the present invention, will be more fully described with reference to some specific embodiments of the present invention.

Preferred embodiments of the present invention will be hereinafter described, with reference to the accompanying drawings, given merely by way of example, and in which:

Fig. 1 is a geometric diagram for explaining the principle of the telemeter according to the present invention;

Fig. 2 is a diagrammatical view of the objective of the telemeter according to the invention;

Fig. 3 is a diagrammatical view of an embodiment of the telemeter according to the present invention;

Figure 4:
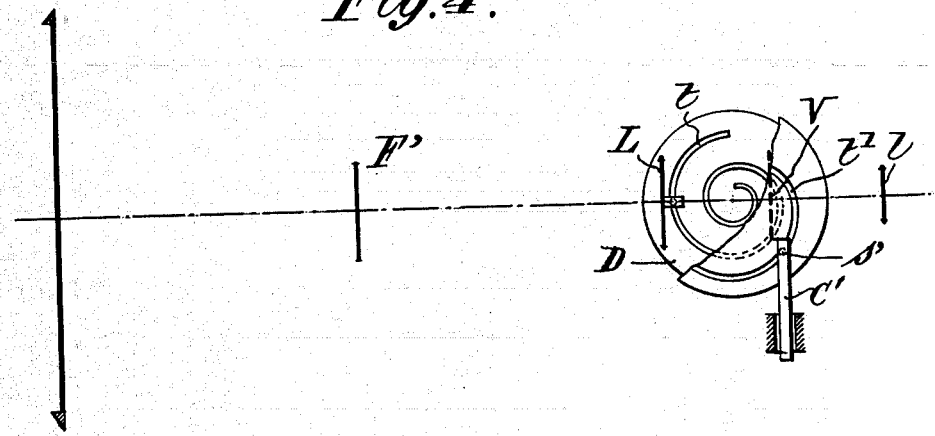
Figs. 4 and 5 are diagrammatical views of other embodiments of the telemeter according to the invention, mounted on firearms.

The so-called "monostatic" telemeters existing prior to the present invention are all based on the principle of measuring one of the acute angles of a right-angled triangle, one side of this triangle, adjacent the angle measured, being the base of the telemeter, and the other side being the distance to be measured.

The precision of these apparatus therefore depends merely upon the length of base, that is to say upon the space occupied by the apparatus.

On the other hand, telemeters of the so-called "coincidence" type require that the object the distance of which is to be measured should have a geometrical shape and, as a rule, their field is very small (about 2 degrees).

All these drawbacks, to wit, large space occupied by the apparatus, necessity of an object that is stationary, limited field, etc., render these instruments useless in many circumstances and especially in aviation, where the object leaves the field of the instrument after one or two seconds.

The new type of telemeter according to the present invention is based on the principle of the displacement of the plane of the image formed by the objective, when the distance from said object to said objective varies.

The theory of this instrument will be set forth with reference to Fig. 1. An objective P, shown on the drawings by its main plane, gives an image O' of the object O.

If the focal length of the objective is F and the distance from the object to the objective is A, the distance from the image O' to the objective will be given by the classical formula:

$$X = \frac{AF}{A-F}$$

When the object moves a distance equal to $\Delta A$, the image O' is displaced a distance equal to $\Delta X$;

$$\Delta X = \frac{-F^2}{(A-F)^2} \cdot \Delta A$$

and as A is of a higher order of magnitude than F, this formula can be written:

$$\Delta A = \frac{A^2}{F^2} \cdot \Delta X$$

Now, $$\frac{\Delta y}{\Delta x}$$

the ratio of the diameter of the diffusion circle $\Delta y$ and of the variation of the distance of the image $\Delta x$, is equal to the relative aperture of the objective $$\frac{1}{\Omega}$$

Finally, the formula is:

$$A = \frac{A^2}{F^2} \cdot \Omega \cdot \Delta y$$

Therefore, in order that the variation $\Delta A$ of the distance from the object to the objective may be detected, it is necessary that $\Omega$ should be as small as possible (that is to say that the aperture of the instrument should be as great as possible) and that F should be as great as possible.

To sum up, by making use of a teleobjective of a great focal length and of great aperture, it is possible to measure distance A, provided, however, that $\Delta y$ permits it.

Now, in order that $\Delta y$ may be easily detected,

I employ, according to the present invention, the following means:

The central part of the objective is opaque or diaphragmed and only a narrow marginal annular portion shall form the image, as shown by Fig. 2. For instance, the objective may consist merely of an annulus P forming the marginal portion of the complete lens of focal length F, the central part of the objective within the annulus consisting of an opaque disc R.

In this case, any point of the object that is not accurately focused will appear as a circle and the image will be fuzzy.

The image will be sharp only when the focusing shall be perfect. By observing with a strong magnifying glass the image received on a fine ground glass, it will be possible to focus the instrument on the object with a high precision.

I will give a numerical example of the error that may occur:

Supposing that the telemeter has a focal length of 4 meters and consists for instance of a positive lens of a focal length of 500 mms. and of a negative lens of a focal length of 100 mms., with an interval of 412.5 mms. between these lenses, and if the aperture of the annular portion of the main objective is 500 mms., then $\Omega$ will be equal to 8.

With a magnifying glass giving a magnification of 20, it is possible to detect fuzziness corresponding to a value of $\Delta y$ equal to 0.01 mms., owing to the absence of depth of the field of the objective.

At a distance of 1,000 meters, the error that may occur is therefore:

$$\Delta A = \frac{A^2}{F^2} \cdot \Omega \cdot \Delta y = \frac{1000^2}{4^2} \cdot 8 \cdot 0.00001 = 5 \text{ meters}$$

At a distance of 4,000 meters, the error will be 80 meters.

It is therefore clear that, according to the present invention, it is possible to obtain easily the same precision as with ordinary "monostatic" instruments, but the space occupied by the apparatus is considerably reduced.

The telemeter according to the present invention has the further advantage that it permits of reading the distance by merely focusing the apparatus, instead of requiring the longer and not very accurate operation of causing two images to coincide.

Fig. 3 discloses, in a diagrammatical manner, an embodiment of a telemeter according to the present invention.

The teleobjective consists of two separate objectives, one of which P is positive, while the other one P' is negative. The objective P, like that shown in Fig. 2, has an opaque disc-like portion R. The whole forms the image of the object on the ground glass V.

These elements P, P' and V are stationary and rigidly connected together. The focusing is obtained by moving the positive lens L (this lens having a great focal length in order that a fairly considerable displacement of this lens is necessary in order to produce a small variation of the position of the image with respect to the objective).

This last mentioned lens may be moved, for instance, by means of a device driven through disc D, said device engaging, for instance a spiral-shaped groove provided in said disc, as shown in Fig. 3. Of course, this is merely a non-limitative embodiment of such a device.

The disc, or the knob through which it is operated can be graduated directly in distances, cooperating for instance with an index $i$. Magnifying glass $l$ serves for the focusing on the ground glass V.

In order to permit of sighting the object and of roughly focussing the instrument, there is provided, in the central one part of objective P, another positive objective I which forms an image on the same ground glass V. When the instrument has been roughly focussed by means of this objective I, the latter is covered by an opaque shutter S and the focussing is finished with the annular objective.

It will be noted that the telemeter according to the present invention shall have the appearance of a tube parallel to the direction of the object while the ordinary telemeters existing at the present time consist of tubes at right angles to the direction of said object.

Owing to this feature, the telemeter according to the present invention can be fixed directly on a firearm (gun, machine-gun, etc.).

Figure 5:
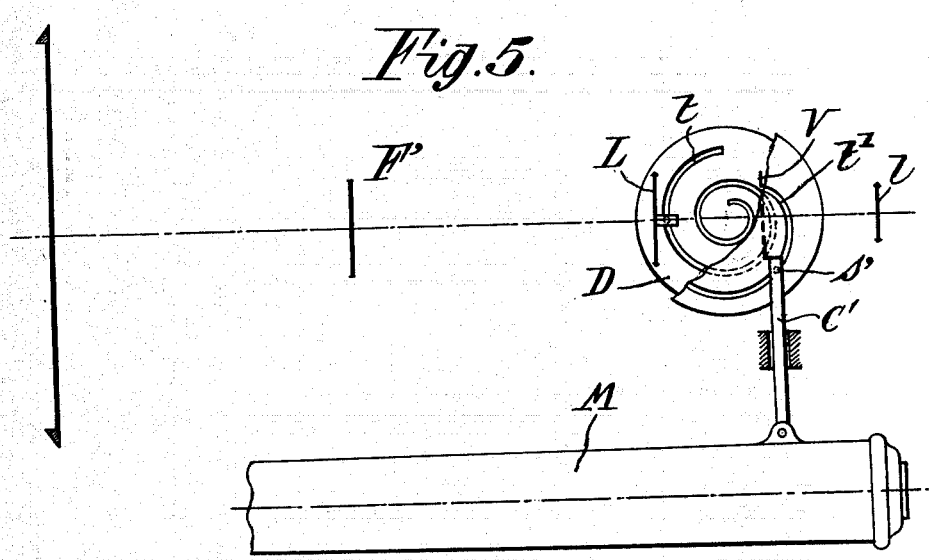

The telemeter above described may be further provided with a reticle located in the plane of the image of the object, and for instance traced on the ground glass V (Figs. 3, 4 and 5).

According to a feature of my invention, this reticle is movable in a plane at right angles to the optical axis of the telemeter.

For instance, as shown in Fig. 4, the ground glass V on which is traced the reticle is carried by a sliding support C', movable in a direction at right angles to the optical axis of the instrument and provided with a pin $s'$ engaging a slot $t'$ formed in disc D.

With an arrangement of this kind, the control knob serving to move disc D angularly for focussing the instrument also serves to move the reticle vertically thus automatically giving the angle of elevation corresponding to the distance of the object.

This angle may be automatically transmitted to the firearm with which the telemeter is associated. For instance, in the embodiment of Fig. 4, V being movable vertically, the firearm is fixed with respect to the optical axis of the instrument.

Alternately, as shown in Fig. 5, the element C' is rigidly connected to the firearm and the reticle is fixed in position with respect to the optical axis of the telemeter. Slot $t'$ forms a kind of cam which inclines the axis of the firearm with respect to the optical axis of the telemeter with an angle corresponding to the distance or range.

With this arrangement, it suffices to sight the object without bothering about the range. When the image of the object is sharp and coincides with the point of intersection of the lines of the reticle, the projectile will strike the object.

Of course, similar corrections might be made in the horizontal direction, for instance in order to take into account the relative wind, especially in an airplane.

When the telemeter according to the present invention is to be used on an airplane having a gun adapted to fire through the propeller, said telemeter may be fixed anywhere, for instance in front of the pilot so as to permit him to steer the airplane without difficulty. In this case the parallax existing between the gun and the axis of the telemeter should obviously be taken into account.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A telemeter for measuring the distance of an object which comprises, in combination, a teleobjective for giving an image of the object, means for diaphragming the central portion of said objective, a screen for receiving the image formed by said objective, means for focusing the image on said screen, the position of said last mentioned means indicating the distance to be measured.

2. A telemeter for measuring the distance of an object which comprises, in combination, a teleobjective for giving an image of said object, means for diaphragming the central portion of said objective, a screen for receiving said image, said screen being fixed in position with respect to the objective in the direction of the optical axis of said objective, a lens movable along said optical axis and means for displacing said lens so as to focus said image on said screen, the position of said lens being an indication of the distance to be measured.

3. A telemeter according to claim 1 further including a lens in the central portion of said diaphragming means, so as to permit of roughly focusing the image on said screen, and an opaque covering for said lens for use when the image is to be focused with precision.

4. In combination, a telemeter for measuring the distance of an object including an objective for giving an image of said object, a screen for receiving said image, means for focusing the image on said screen, a firearm associated with said telemeter, and means operatively connected with said focusing means for inclining the axis of said firearm with respect to the direction of said object by an amount corresponding to the elevation of the firearm due to the distance of the firearm from said object.

5. A telemeter according to claim 1 further including a reticle formed on said screen and means operatively connected with said focusing means for moving said reticle in a direction at right angles to the optical axis of the telemeter in accordance with the distance of said object.

6. In combination, a telemeter for measuring the distance of an object including, an objective for giving an image of said object, a screen for receiving said image, a reticle formed on said screen, means for focusing the image on said screen, a firearm associated with said telemeter, and means operatively connected with said focusing means for moving said reticle in a direction at right angles to the optical axis of the telemeter by an amount corresponding to the elevation of the firearm due to the distance of the firearm from said object.

7. A telemeter for measuring the distance of an object which comprises, in combination, a teleobjective for giving an image of the object, said objective comprising a least one annular lens and diaphragming means arranged in the interior of said annular lens, a screen for receiving the image formed by said objective, and means for focusing the image on said screen.

8. A telemeter for measuring the distance of an object, which comprises, in combination, a teleobjective comprising an annulus forming a portion of a lens and having means to prevent the passage of light through the portion within the annulus, a screen for receiving the image of the object formed by said teleobjective, adjustable means for producing a focusing of the image on the screen, and means to indicate the position of said adjustable means to determine the distance of the object.

9. A telemeter for measuring the distance of an object, comprising an objective including an annulus forming a portion of a lens and having means to prevent the passage of light through the portion within the annulus, a screen arranged at a fixed distance from said objective for receiving the image of the object formed thereby, and means movable with respect to said objective and screen to focus the image on the screen, the position of said last means indicating the distance to be measured.

ISAAC KITROSER.